March 30, 1943.                G. H. J. BAULE                2,314,918
                           BOTTLE CAPPING MACHINE
              Filed Jan. 21, 1941              7 Sheets-Sheet 3

INVENTOR:
Gerhard H. J. Baule
BY Bodell & Thompson

March 30, 1943. G. H. J. BAULE 2,314,918

BOTTLE CAPPING MACHINE

Filed Jan. 21, 1941 7 Sheets-Sheet 4

INVENTOR:
Gerhard H. J. Baule,
BY Bodell & Thompson

March 30, 1943.  G. H. J. BAULE  2,314,918
BOTTLE CAPPING MACHINE
Filed Jan. 21, 1941  7 Sheets-Sheet 5

INVENTOR:
Gerhard H. J. Baule,
BY Bodell & Thompson

March 30, 1943.  G. H. J. BAULE  2,314,918
BOTTLE CAPPING MACHINE
Filed Jan. 21, 1941  7 Sheets-Sheet 7

INVENTOR:
Gerhard H. J. Baule,
BY Bodell & Thompson

Patented Mar. 30, 1943

2,314,918

UNITED STATES PATENT OFFICE 2,314,918

BOTTLE CAPPING MACHINE

Gerhard H. J. Baule, Syracuse, N. Y., assignor to Oswego Falls Corporation, Fulton, N. Y., a corporation of New York Application January 21, 1941, Serial No. 375,169

13 Claims. (Cl. 226—83)

This invention relates to machines for applying hood caps to bottles, the caps being formed of flexible sheet material with the skirt portion of the cap rendered adhesive by the application of heat just prior to positioning the cap on the bottle.

More particularly the invention relates to a machine of the type referred to wherein the caps are joined together in strip formation.

The machine includes means for advancing a procession of bottles to a cap applying station, in the proximity of which an oven or cap heating means is located, and cap feeding means is provided for advancing the strip of caps through the oven and positioning the heated caps successively in cap applying position, the arrangement being such that the cap predestined for each bottle advancing in the procession is moved into the oven, heated and subsequently moved out of the oven to cap applying position where it is placed upon the top of the bottle and thereafter the marginal portion of the cap is folded about the neck of the bottle and the overlapping portions of the skirt are contracted and are permanently secured together by the heated adhesive condition of the cap.

In a machine of the type above referred to, it is necessary that each cap remain in the cap heating oven a predetermined minimum time in order that the cap may be rendered properly adhesive. Inasmuch as the bottles are being advanced in a procession, this requires the strip of caps to be advanced intermittently when each bottle is positioned remote from the cap applying station, and due to the fact that the caps are joined in strip formation, each time the strip is advanced to move the heated cap out of the oven to cap applying position, a new cap is moved into the oven. In the event there is not a uniformly spaced succeeding bottle in the procession, the new cap advanced in the oven will not only remain therein for the predetermined minimum time, but may remain in the oven for an indefinite period of time, with the result that the cap becomes overheated to an extent to fatally damage the adhesive characteristics of the cap, or to an extent where the cap is burned or completely rendered unfit for use.

This invention has as its chief object a machine of the particular type referred to embodying a novel mechanism operable to advance the cap strip in timed relation to the advance of each bottle in the procession to position a cap in the oven for each bottle, and to subsequently advance the strip to move the heated cap out of the oven to cap applying position, and which is further operable in the event of the absence of a uniformly spaced bottle in the procession to retract the strip to withdraw the cap then positioned in the oven, and operable to again initially advance the strip to move such cap into the oven upon the presence of the next succeeding bottle. Or, this object may be stated briefly as embodying cap strip feeding mechanism operable in a manner whereby each cap remains in the cap heating oven for only a predetermined length of time after which it is advanced forwardly out of the oven to be applied to the bottle or, if there is an interruption in the procession of bottles and accordingly no bottle present to receive the cap positioned in the oven, that cap is immediately withdrawn from the oven until a succeeding bottle appears in the procession. This mechanism is entirely operable automatically, but means is provided whereby the cap advancing mechanism may be operated manually to effect proper adjustments and for other purposes.

The invention consists in the novel features and in the combinations and constructions hereinafter set forth and claimed.

In describing this invention, reference is had to the accompanying drawings in which like characters designate corresponding parts in all the views.

The machine is herein illustrated as applying paper hood caps to conventional milk bottles B which are fed to and from the machine by the conventional conveyor 20 extending across the front of the machine. The machine consists of a base 21 having an upper section 22 secured in place as by bolts 23. The base is formed with a plurality of downwardly extending ribs 24, channel shaped in cross section and being closed at the lower end as by a wall 25. Three of the ribs 24 are formed with an aperture in the bottom wall 25 to slidably receive supporting legs 26, the upper ends of which are engaged by adjusting screws 27 threaded into bosses 28 formed in the channel section of the ribs.

The base 21 is also formed with an upwardly extending elongated hub portion 30 formed at its lower end with a cylindrical bore to receive a circular nut 31 mounted in the hub 30 on antifriction bearings 32 and being retained in the hub by an annular member 33 secured thereto as by cap screws 34.

The upper portion of the hub 30 is apertured to slidably receive a post 35, the lower end of which is threaded into the nut block 31. A ring gear 36 is secured to the lower end of the nut 31 and is engaged by a pinion 37 mounted upon the inner end of a shaft 38 transversely journalled in a boss 40 formed in one of the depending channel shaped ribs. The outer end of the shaft 38 extends through a cylindrical sheet metal casing 39 encircling the base and forming a closure therefor. The outer end of the shaft 38 is formed with a tool receiving surface 41 by which the shaft may be manually rotated to effect rotation of the nut 31 and vertical adjustment of the post 35 in order that the machine may perform on bottles of different heights, as will be hereinafter apparent.

The bottles are advanced in a procession by a turret 42 provided with bottle receiving pads 43, each being mounted upon a stem 44 slidable vertically in the turret and retained from rotation by a pin 45 extending downwardly from each bottle pad through an aperture formed in the top wall of the turret. The turret is also formed with an elongated hub having an upwardly extending portion 46 and a downwardly extending portion 47. The portion 47 is bored to form a shoulder 48 resting upon a thrust washer 49 carried by the hub portion 30 of the base, and the lower end of the portion 47 is bored for rotation upon a bushing 50 encircling the lower portion of the hub 30 of the base. Rotation of the turret about this vertical axis is accomplished by means of a ring gear 51 bolted to the end of the lower hub portion 47 and which is arranged to mesh with a pinion 52 keyed to the upper end of a vertically arranged shaft 53 extending upwardly from a transmission housing 54 arranged in the base and operated by a motor 55. The upper end of the hub portion 46 is bored to rotate on a bushing 58 encircling the upper end of the hub 30, and upward axial movement of the turret is prevented by a thrust ring 59 detachably secured to the end of the hub 30.

The bottles B are fed from the conveyor 20 to the turret 42 by an in-feed wheel 60 mounted upon the upper end of a shaft 61 journalled in a vertically arranged boss 62 formed in the upper base section 22 and being provided with a gear 63 arranged in mesh with the turret ring gear 51. The rotation of the star wheel is accordingly timed with the rotation of the turret and is such as to move the bottles onto the bottle pads 43.

Figure 3:
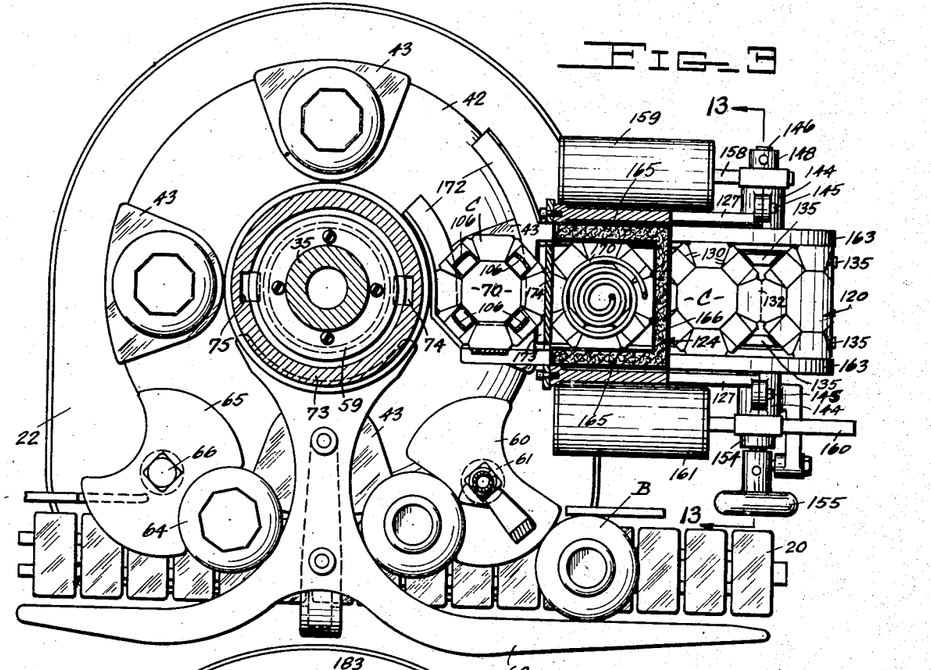
Figure 3 is a transverse sectional view taken on substantially line 3—3, Figure 2.

The capped bottles, as indicated at 64, Figure 3, are removed from the turret and returned to the conveyor 20 by an out-feed wheel 65 secured to the upper end of a shaft 66 similarly journalled in the boss 67 and provided with a gear 68 also arranged to mesh with the ring gear 51. The bottles are guided onto and off from the turret by a guide member 69.

As the bottles B are advanced by the turret 42, a heated cap is severed from the cap strip and applied to the top of the bottle at a cap applying station which may be designated by the cap 70, Figure 3. At this station relative axial movement is effected between the bottle and the cap to place the cap on the top of the bottle and thereupon the marginal portion of the cap is folded downwardly about the neck of the bottle and contracted tightly against the same. This folding and contracting operation is accomplished by an annular series of cap folding and contracting heads 71, there being one of such heads positioned axially above each of the bottle stools 43. The cap contracting heads are secured to a disk 72 formed with a depending hub portion 73 slidably mounted upon the upper hub portion 46 of the turret. The hub portion 46 is provided with axially extending keys 74, and the hub 73 is formed with axially extending slots 75 to slidably receive the keys 74, the purpose of which is to effect rotation of the disk 72 in unison with rotation of the turret.

The disk 72 is rotatably mounted on an antifriction bearing 76 supported on the upper end of the post 35 and being secured thereto by a sleeve 77 encircling the post and secured to the same against rotation by a plate 78 secured to the post as by screws 79, with the marginal portion of the plate overlapping the upper end of the sleeve 77. The sleeve 77 is formed with a radially extending flange 80 adjacent its upper end and on which is mounted the top casing 81 of the machine, as by screws 82.

Figure 10:
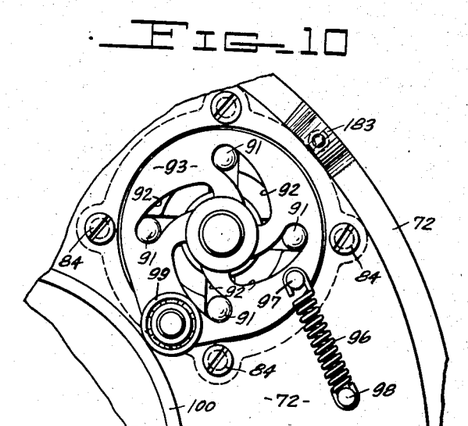
Figure 10 is a top plan view of a cap contracting head and contiguous portions of the machine.

The cap contracting heads 71 are secured to the disk 72 as by screws 84. These heads are formed with a hub 85 supported by a plurality of radial ribs 86, to the lower ends of which are pivotally connected a series of cap contracting members 87. These members are formed with downwardly extending cap engaging fingers 89 and upwardly extending stems 90 provided with spherical surfaces 91 arranged in arcuate slots 92 formed in a disk 93 rotatably mounted upon a sleeve 94 secured in the hub 85 as by set screw 95. The arrangement is such that upon rotation of the disk 93, the fingers 89 are moved toward and from the axis of the bottle. The disk 93 is yieldingly urged in a clockwise direction, Figure 10, by a helical tension spring 96, one end of which is secured to a pin 97 carried by the disk 93, and the opposite end to a pin 98 carried by the supporting disk 72. Each of the disks 93 is provided with a roller 99 arranged to engage a cam 100 detachably secured to a lower flange 101 formed on the sleeve 77 as by screws 102.

Figure 4:
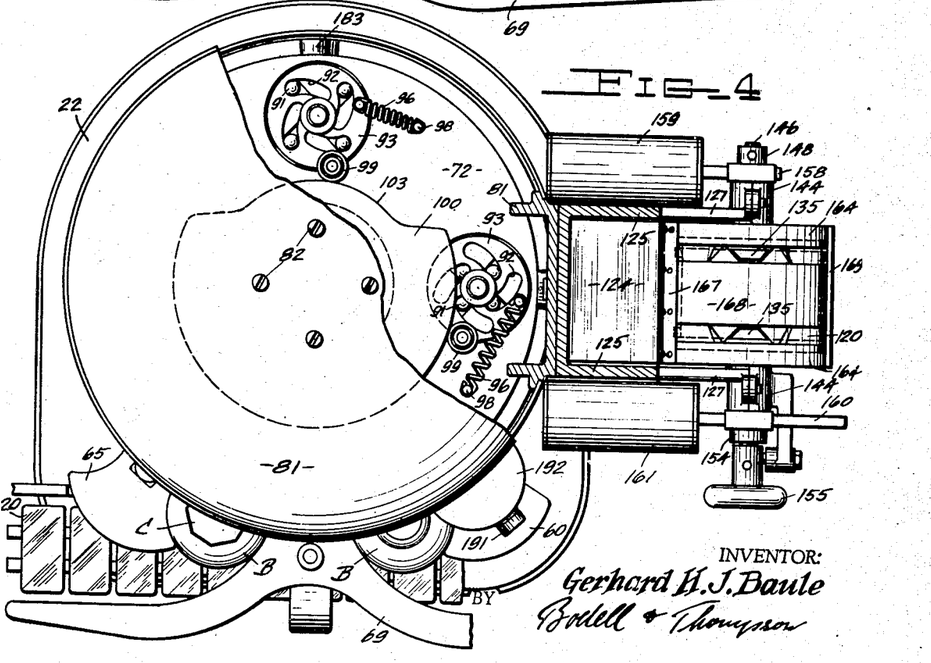
Figure 4 is a top plan view of the machine with parts broken away and parts shown in section.
Figure 5:
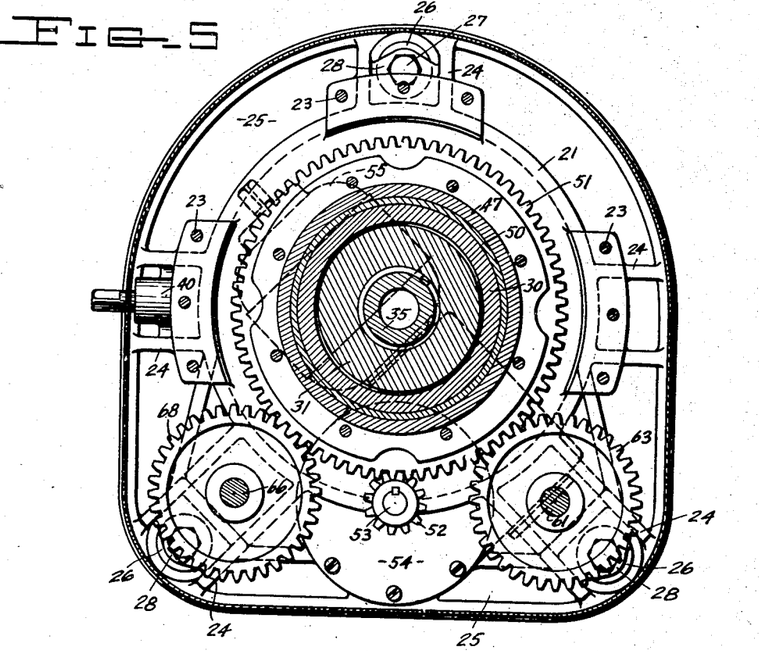
Figure 5 is a sectional view taken on line 5—5, Figure 2.
Figure 6:
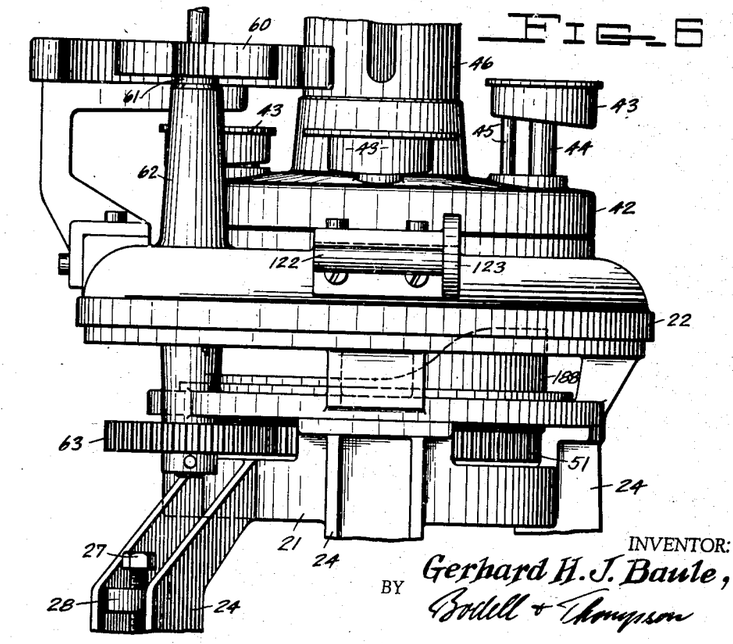
Figure 6 is a side elevational view of the central portion of the machine looking to the left Figure 1.
Figure 7:
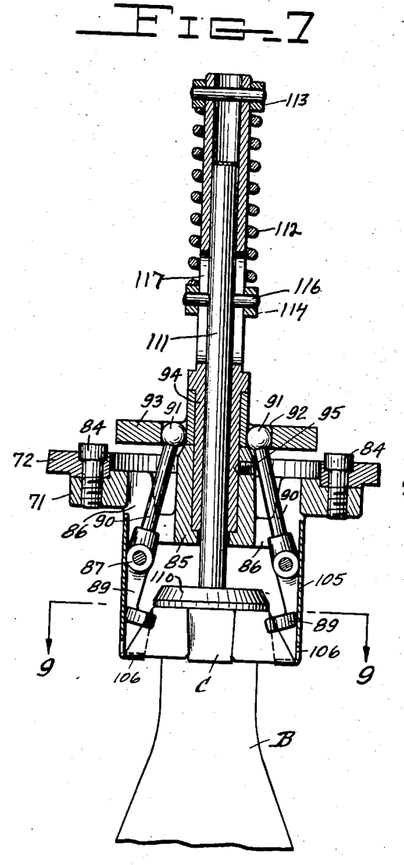
Figure 7 is a vertical sectional view of the cap folding and cap skirt contracting head with the skirt contracting members in open position.
Figure 8:
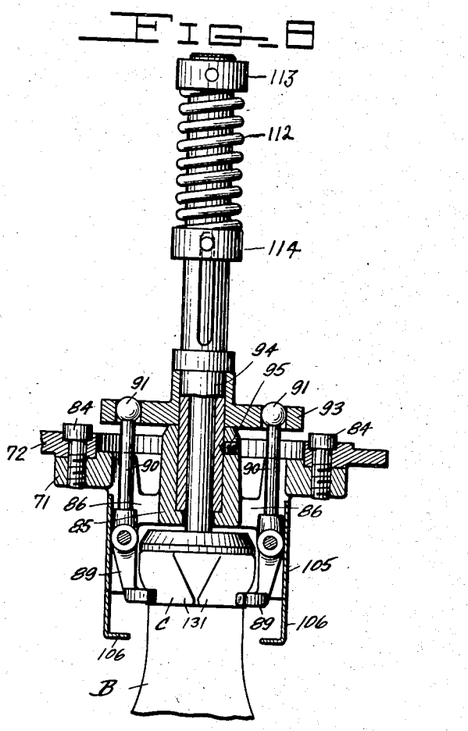
Figure 8 is a view, similar to Figure 7, with the skirt contracting members actuated to closed position.
Figure 9:
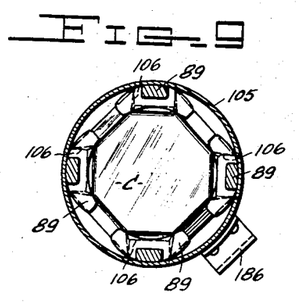
Figure 9 is a sectional view taken on line 9—9, Figure 7.

The low portion 103 of the cam 100, Figure 4, is arranged to permit the disks 93 to be rotated under the action of the spring 96 to close the fingers 89 and contract the skirt of the cap against the neck of the bottle, and the cam 100 is so arranged as to effect this operation after the cap has been positioned on the top of the bottle. The low portion 103 of the cam 100 terminates previous to the time the bottle has reached the out-feed wheel 65, and at this time the fingers 89 are moved in the out position, as shown in Figures 7 and 9, to permit the capped bottle to be released from the contracting head. The fingers 89 are enclosed by a cylindrical member 105 depending from the head and formed with circumferentially spaced apart and inwardly extending flanges 106 which serve to engage certain of the panels or pleats of the cap disk and fold the same downwardly to effect an initial formation of the skirt portion of the cap.

Upon relative axial movement between the bottle with the heated cap thereon and the cap contracting head, the center of the cap is engaged and the cap held on the top of the bottle by a presser foot 110 mounted on the lower end of a stem 111 slidably mounted in sleeve 94. The stem 111 is yieldingly pressed downward by spring 112 encircling the upper portion of the sleeve 94 and being arranged between a collar 113 pinned to the sleeve and a collar 114 secured to the stem 111 as by pin 115 slidable in a slot 117 formed in sleeve 94.

The cap strip 120 is fed from a roll on a spool 121 journalled on a pin 122 carried by a suitable bracket 123 extending laterally from the side of the base section 22. The cap heating oven, designated generally at 124, is mounted in a bracket having side portions 125 secured at their upper ends to the head casing 81 and being connected at their lower ends by a transversely extending wall 126. The lower portion of each side wall 125 extends outwardly to form a continuation 127 of the bracket, and the extending walls 127 are connected by an intermediate web 128.

The caps C are octagonal in general shape and the marginal portion of the cap is provided with a plurality of score lines 130 which define panels or pleats 131 when the skirt portion of the cap is folded and contracted about the top of the bottle. The caps are joined one to the other to form the strip 120, and after the strip is advanced to move a cap out of the oven 124, it is severed as indicated at 132, Figure 3. The strip 120 is trained over a drum 133 journalled between the outwardly extending portions 127 of the bracket. The drum is formed with a series of circumferentially spaced radial projections 135 so spaced and formed as to engage the caps adjacent the panels that are attached together to make the strip formation 120. The projections 135 thus serve as means to properly guide and index the caps during the advancement of the strip upon rotation of the drum 133.

Means is provided for effecting intermittent rotation of the drum in timed relation to the rotation of the bottle turret 42, and this means for effecting such rotation of the drum is under the control of a bottle actuable member, and the arrangement is such that the drum is rotated to advance the strip 120 to position a cap in the oven 124 as the first bottle of the procession, or sub-procession, enters the in-feed wheel 60, and when this bottle has been advanced by the turret to near the cap applying station, indicated at 70, Figure 3, the drum 133 is again rotated, advancing the strip to move the heated cap out of the oven to the cap applying station, whereupon the heated cap is severed from the strip and applied to the top of the bottle.

The drum operating mechanism further includes means operable, in the event of the absence of a uniformly spaced bottle in the procession, to rotate the drum in reverse direction thereby retracting the strip to withdraw the cap advanced into the oven 124 by the advancing of the previous cap to the cap applying station, all whereby each cap is only maintained in the oven 124 for a predetermined time, in the event of the presence of a bottle, at the end of which it is advanced outwardly to the cap applying position. In the event of the absence of a bottle in the procession, the cap then positioned in the oven is immediately, after the severing operation retracted from the oven. The purpose of this mechanism, as previously stated, is to prevent the caps from becoming overheated previous to their application to the bottles.

A plurality of compensating gears 140 are journalled within the drum 133 and are arranged in mesh with driving gears 141, 142, which gears are independently driven thereby effecting a differential drive from the drum.

The outer ends of the ribs 127 are formed to receive bearing caps 144 which are secured thereto as by cap screws 145. The gear 142 is pinned to the end of a shaft 146 journalled in the outer end of one of the ribs 127, and a pinion 148 is pinned to the opposite end of the shaft 146. The gear 141 is pinned to the inner end of a shaft 149 journalled in a sleeve 150 which, in turn, is journalled in the outer end of the other rib 127. The gear 141 is formed with a cylindrical flange 151 formed with one or more notches 152 to receive a pawl 153 carried by the sleeve 150. A pinion 154 is pinned to the outer end of the sleeve 150. The outer end of the shaft 149 is provided with a hand wheel 155. The arrangement is such that when the sleeve 150 is rotated in a clockwise direction Figure 12, the pawl 153 will over-ride the notches 152 and the gear 141 will remain stationary. When however the sleeve 150 is rotated in a counter-clockwise direction, the pawl 153 engages the notches 152 under the action of the compression spring 157 and thus rotation is imparted from the sleeve 150 to the gear 141.

The pinion 148 is rotated by means of a rack 158 moved inwardly toward the machine by a solenoid 159. The pinion 154 is rotated by means of a rack 160 moved inwardly toward the machine by a solenoid 161. Both of the racks 158, 160 are moved outwardly by means of a spring arranged within the solenoids.

Guide rails 163 are secured to the horizontal wall 126 adjacent each of the ribs 125 and extend outwardly in juxtaposition to the drum 133. The confronting edges of the rails 163 are recessed to receive the edges of the caps C of the strip formation 120, the caps being retained against upward movement by flat strips 164 arranged on the upper surfaces of the rails 163.

The oven 124 consists of a top wall and depending side walls 165, and an end wall 166. The oven is arranged intermediate the ribs 125 of the bracket and is supported by and secured to the rails 163 underneath the side walls 165. A guard plate 168 extends axially over the center of the strip and about the drum, as do also the flat strips 164. The ends of the strips 164 and the guard 168 are connected by cross braces 167 and 169, the cross brace 167 being an angle piece removably fastened to the end wall 166 of the oven. The oven is heated by an electrically operated heating element 170. With this arrangement, upon rotation of the drum 133, the strip 120 is advanced to successively position the caps in the oven 124 under the heating element 170.

After each cap has remained in the oven for a predetermined time, and in the event there is a bottle present to receive the cap, the strip is advanced to move the cap forwardly out of the oven and position the same upon arcuate guide members 172 and thereupon this cap is severed from the adjacent cap by a knife 173 which is moved upwardly and which cooperates with a stationary upper knife 174. The knife 174 is secured to a cross member 175 which, in turn, is secured at its ends to the ribs 125. The lower movable knife 173 is carried by a U shaped bracket 177, the legs of which are formed with elongated slots 178 to receive shouldered screws 179 threaded into the ribs 125, whereby the bracket 177 is movable vertically on the ribs 125. The ends of the leg portions of bracket 177 extend laterally as at 180, and a yoke 181 is connected at its ends to the laterally extending portions 180 and is provided intermediate its ends with a roller 182 arranged to be engaged by a lobe 183 secured to the periphery of the disk 72.

The bracket 177 is yieldingly urged downwardly by a tension spring 184, one end of which is connected to the bracket 177, and the opposite end to a pin 185 mounted upon the rib 128. The lower knife 173 is normally spaced downwardly from the stationary knife 174 to permit the strip 120, or the caps thereof, to be fed between the knives, and the lobe 183 is so positioned that immediately upon a cap being fed out of the oven onto the guide rails 172, the lower knife is moved upwardly to sever the cap from the strip. This action of the lower knife is substantially instantaneous and thereupon the severed cap is engaged by a depending member 186 depending from the shell 105 of each capping head, and as the cap is moved along the arcuate supporting rails 172 the stem 44, on which the bottle pad 43 is mounted, is elevated by the roller 187 journalled in the lower end of the stem engaging a lobe on the cam track 188 secured to the upper section 22 of the base, see Figure 2. This elevation is sufficient to move the top of the bottle into engagement with the cap, and to move the cap upwardly into the shield 105, whereupon the marginal portion of the cap is folded to form the skirt of the cap, and the folded skirt is contracted about the bottle by the fingers 89. The bottle is maintained in this elevated position until it approaches the out feed wheel 65, whereupon the roller 187 passes upon a low portion of the cam track 188, removing the top of the capped bottle from the contracting head. The bottle is thereupon engaged by the out-feed wheel 65 and returned to the conveyor 20.

When the first uncapped bottle enters the in-feed wheel 60, it is engaged by a bottle actuatable finger 190 carried at the lower end of an arm 191, the upper end of which is pivotally mounted to a switch housing 192 supported from the upper portion of the machine. When actuated, the finger 190 moves the arm 191 to actuate a switch contact 194 into engagement with a contact 195. The closing of the contacts 194, 195 completes a circuit to the solenoid 159 as follows: Hot side of the line 196, wire 197, contacts 194, 195, wire 198, relay coil 199, wire 200, to the common side of the line 201. When the coil 199 is thus energized, armature 202 is moved upwardly, Figure 11, causing contact 203 to bridge contacts 204, 205. Contact 204 is connected to the hot side 196 through wire 206, and contact 205 is connected to a solenoid 159 through wire 207, the other side of the solenoid being connected to the common side of the line, as indicated at 208.

Figure 1:
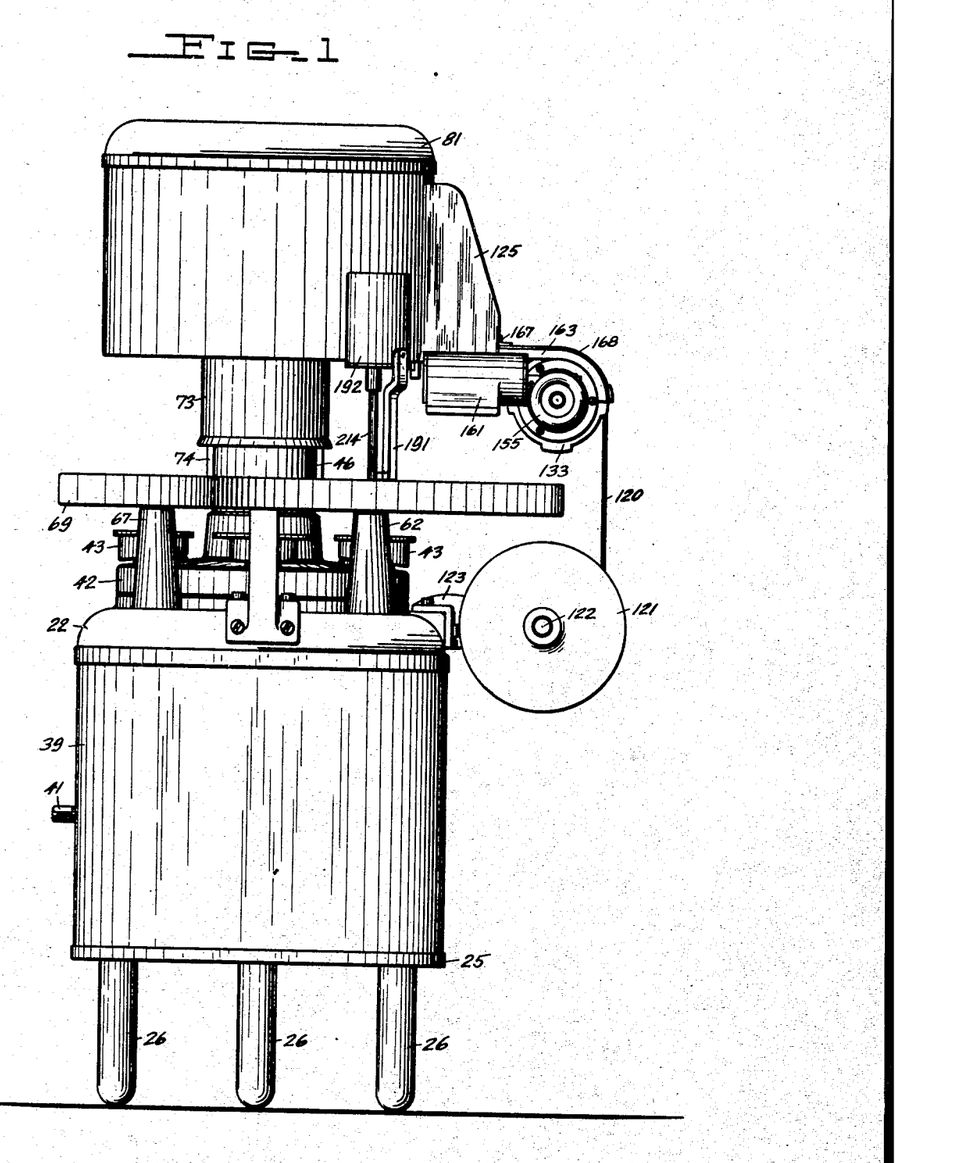
Figure 1 is a front elevational view of a machine embodying my invention.
Figure 2:
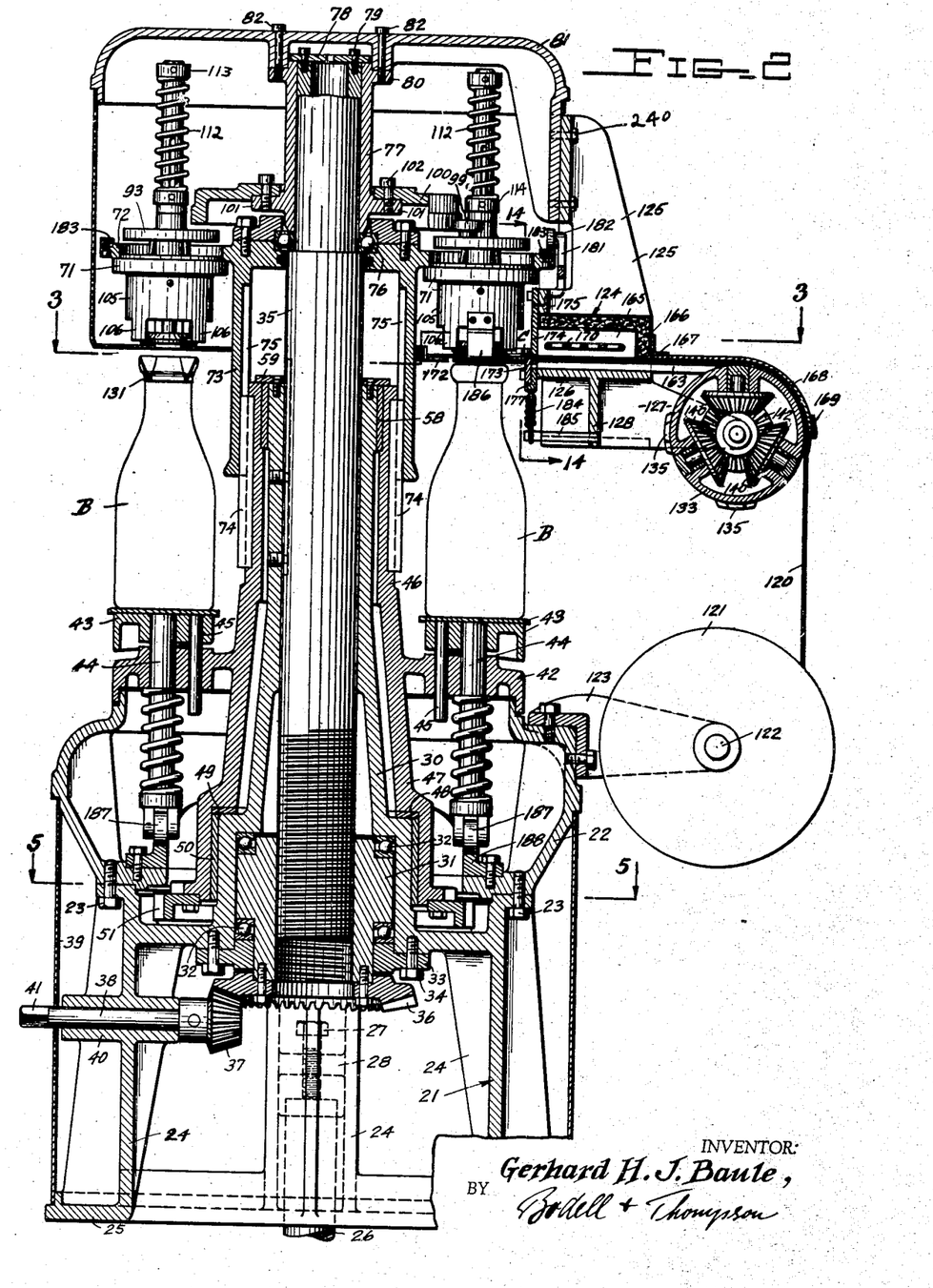
Figure 2 is a vertical sectional view of the machine shown in Figure 1.

When the solenoid 159 is thus energized, the rack 158 is drawn inwardly causing the gear 142 to be rotated in a counterclockwise direction Figure 2, and inasmuch as the gear 141 is at this time stationary, the drum 133 is likewise rotated in a counterclockwise direction, the movement of the rack being such as to rotate the drum 133 sufficiently to move the first cap of the strip into the oven 124.

While the cap thus moved into the oven is being heated, the bottle is traveling toward the cap applying station 70. Just previous to the time the bottle reaches the station, contacts 210, 211 are closed in the following manner. A cam 213 is secured to the upper end of a shaft 214 journalled in the switch housing 192 and extending downwardly and being connected to the upper end of the shaft 61 on which the star wheel 60 is mounted. As here shown, the star wheel 60 is formed with two concavities, and the cam 213 is formed with two lobes 215. The relative arrangement of these lobes is such that just previous to the time the bottle reaches the capping station 70, Figure 3, one of the lobes 215 engages the contact 210 and moves it into engagement with the contact 211 completing a circuit to the solenoid 161 as follows. Wire 206, contacts 204, 203, 205, wire 207, wire 216, contact 211, contact 210, wire 217, to solenoid 161, the other side of which is connected to the common 201 through wire 218.

Attention is called to the fact that the relay coil 199 is provided with a stick circuit as follows. Contacts 219, 220, 221, wire 222, contacts 223, 224, wire 225, to hot wire 206. The contacts 223, 224 are normally in engagement, being so maintained by a cam 226 mounted upon the shaft 214 and provided with notches 227. The arrangement of the notches 227 is such that the contacts 223, 224 are closed previous to the time that the bottle passes out of engagement with finger 190, and the contacts remain closed until after the contacts 210, 211 are closed. In other words, when a bottle enters the in-feed wheel 60, relay 199 remains energized until after that bottle reaches the cap applying station.

Figures 11, 12:
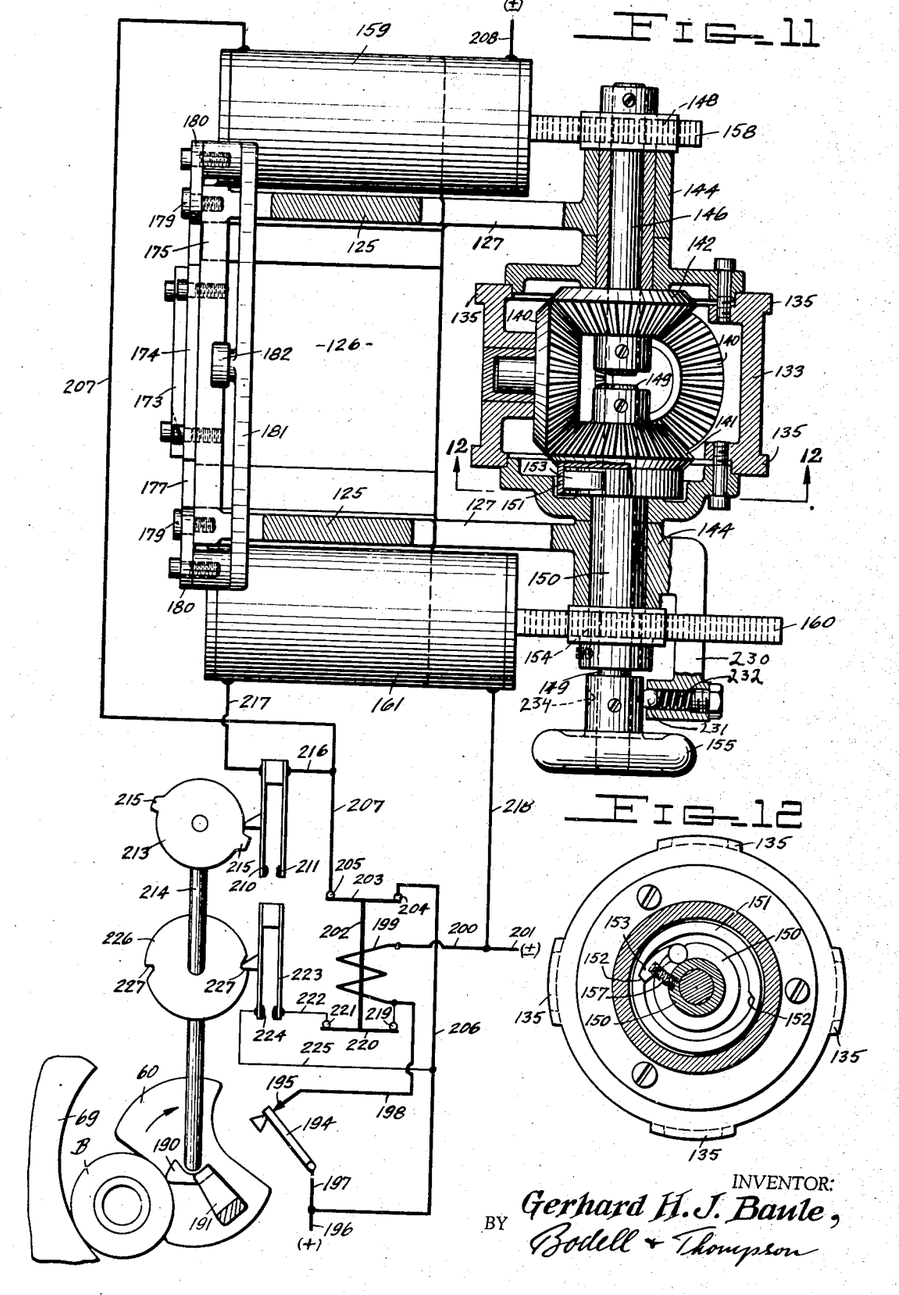
Figure 11 is a top plan view of the cap strip feeding and severing mechanism with parts shown in section and including a schematic wiring diagram illustrating the electrical connections for this mechanism.
Figure 12 is a sectional view taken on line 12—12, Figure 11.
Figure 13:
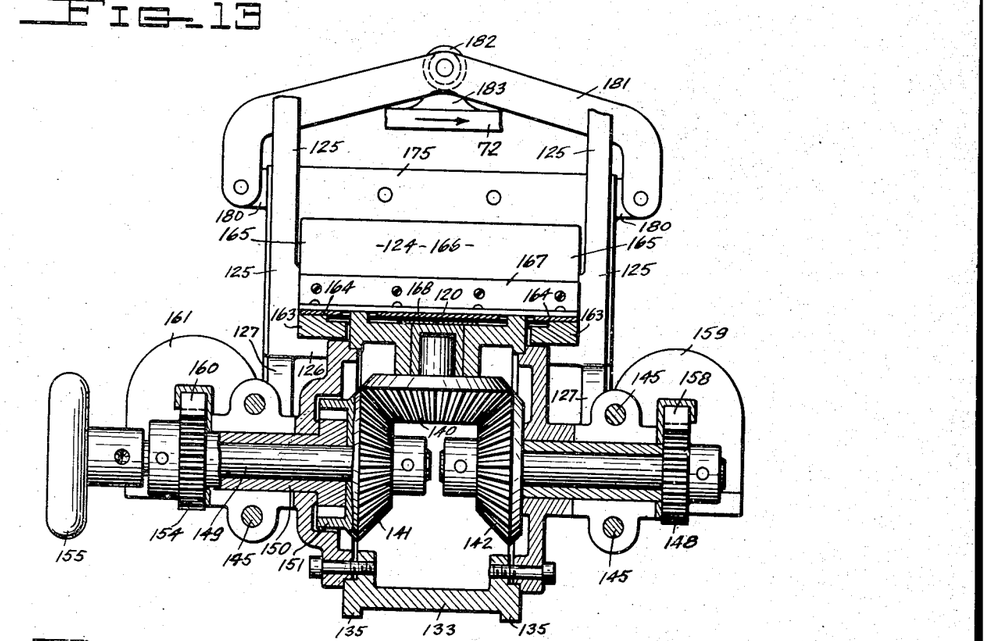
Figure 13 is a sectional view of the cap strip feeding mechanism with the cap cutting mechanism shown in elevation, the view being taken substantially on line 13—13, Figure 3.
Figure 14:
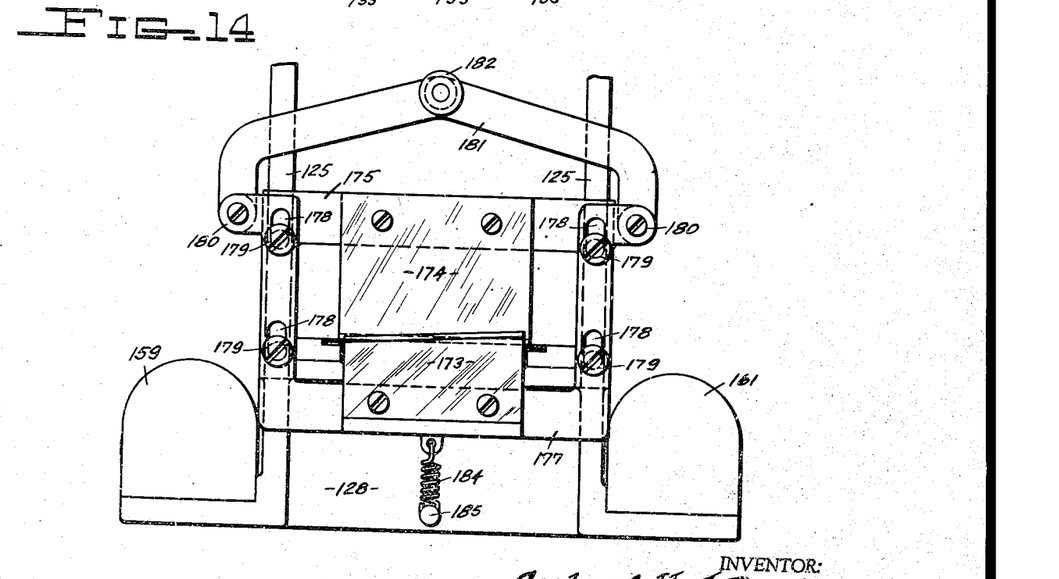
Figure 14 is an elevational view of the cap cutting mechanism taken on a line corresponding to line 14—14, Figure 2.

Solenoid 161 having thus been energized, rack 160 is drawn inwardly rotating gear 141 in a counter-clockwise direction, Figure 12, and inasmuch as rack 158 has during this interval been held inwardly and is now stationary, drum 133 is rotated to again advance the strip to move the cap, which has been heated in the oven outwardly on the supporting rails 172, whereupon it is immediately severed from the strip as previously explained and applied to the bottle.

It will be apparent that if the uncapped bottles are advanced in uniform spaced relation, or in such manner as to fill each pocket of the star wheel 60, the relay 199 will remain constantly energized and thus the solenoid 159 will likewise remain energized holding the rack 158 in in-position, as shown in Figure 11, and as each of the bottles approaches the capping station, the solenoid 161 will be momentarily energized to advance the strip, effecting intermittent feed of the caps from the oven to the supporting rails 172 for application to the bottles. However, in the event the bottles should not be uniformly spaced on the conveyor 20, or should not be advanced in such manner as to fill each pocket of the in-feed wheel 60, the cap, which has been moved into the oven upon the feeding out of the previously heated cap, will be retracted from the oven in the following manner. Under these circumstances, finger 190 will of course not be actuated due to the absence of a bottle and accordingly, contacts 194, 195 will not be closed. Thereupon, the follower of contact 224 will drop into one of the notches 227 of cam 226, and the stick circuit to relay 199 will be opened, permitting armature 202 to drop and thus open the circuit to the solenoid 159. The rack 158 will immediately move outwardly rotating the gear 142 in reverse or clockwise direction, Figure 2, and inasmuch as the gear 141 is at this time stationary, the drum 133 will be rotated in reverse direction causing the cap strip 120 to be retracted and the cap just pushed into the oven to be withdrawn therefrom. When the next succeeding bottle enters the in-feed wheel 60, the finger 190 will be actuated and accordingly the solenoid 159 energized, as previously stated.

In order to prevent retrograde movement of the gear 141 when the rack 158 moves outwardly, the bearing cap 144, adjacent the rack 160, is formed with a laterally extending bracket 230, the end of which is apertured to receive a ball 231 urged inwardly against the hub of hand wheel 155 by helical compression spring 232. The hub of the hand wheel is formed with indentations 234 into which the ball 231 is urged upon each inward movement of the rack 160.

It will be apparent that the maximum period a cap may be maintained in the oven 124 is during the travel of the bottle from the in-feed wheel to near the cap applying position. The arrangement is such that this period of time is sufficient to properly heat the cap. However, upon the absence of a bottle in the procession, the cap only remains in the oven a very short time before it is withdrawn and thus, if bottles are presented to the machine intermittently in non-uniformly spaced relation, each cap is nevertheless properly processed for application.

It will be observed that the cap feeding mechanism, the heating oven, and the severing mechanism, all constitute an integral unit carried by the bracket 125 which is detachably mounted to the head section 81 of the frame by cap screws 240. This construction is particularly advantageous in that it permits all of these mechanisms to be quickly and conveniently removed as a unit by simply disconnecting the wires to the solenoids 159, 161, and to the heater coil 170, and removing the cap screws 240. Thus, in a few minutes the entire cap feeding, heating, and severing mechanisms are removed and a new unit may be installed. In the event any of these mechanisms of the unit become out of order, the unit can be quickly removed and a new one replaced, permitting the used unit to be returned to the factory for repairs or adjustment. With this arrangement, the machine need only be shut down for a few minutes in the event any of these mechanisms should become out or order during the bottle capping operation. The importance of this advantage will be readily appreciated by those familiar with bottle capping conditions in dairies.

What I claim is:

1. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, cap strip advancing and retracting means, a bottle actuatable member arranged remote from the capping station and being actuated by each bottle of said procession, said strip feeding means being operable upon actuation of said member by successive bottles presented thereto in predetermined timed relation to advance the strip as each bottle approaches the capping station to successively move heated caps out of the oven to the capping station, cutter means operable to sever the heated cap positioned at the cap applying station, and cap contracting and securing means operable to secure the cap on the top of the bottle, and said strip feeding and retracting means being operable, upon failure of a bottle being presented to said bottle actuatable member in such predetermined timed relation, to retract said strip and move the cap then positioned in the oven out of the oven.

2. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, cap strip advancing and retracting means, a bottle actuated member arranged remote from the capping station and being actuated by each bottle of said procession, said strip advancing and retracting means being operable upon actuation of said member by the first bottle of said procession to advance the strip and position a cap in the oven, said means being operable as the bottle approaches the capping station to further advance the strip to move the heated cap out of the oven to the capping station and to move the next succeeding cap into the oven, a cutter operable to sever the heated cap from the strip after the cap has been advanced out of the oven, said strip advancing and retracting means being also operable, in the event said bottle actuated member is not actuated by a succeeding bottle within a predetermined time, to retract said strip and withdraw said next succeeding cap from the oven.

3. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, cap strip feeding and retracting means, a bottle actuated member arranged remote from the capping station and being actuated by each bottle of said procession, said strip advancing means being operable upon actuation of said member to advance a cap into the oven, and said strip feeding and retracting means being operable upon actuation of said member by successive bottles presented thereto in predetermined timed relation to advance the strip as each bottle approaches the capping station to successively move heated caps out of the oven to the capping station, and said means being operable upon failure of a bottle being presented to said member in such predetermined timed relation to retract said strip.

4. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a drum, said strip engaging said drum and the drum being operable upon rotation in one direction to advance said strip and operable in the opposite direction to retract said strip, a bottle actuated member arranged remote from the capping station and being actuated by each bottle of said procession, means operable upon actuation of said member by the first bottle of said procession to effect rotation of said drum to advance the strip and position a cap in the oven, and said means being operable as the bottle approaches the capping station to effect further rotation of said drum to move the heated cap out of the oven to the capping station, and to position the next succeeding cap in said strip in the oven, a cutter operable to sever the heated cap from the strip after the cap has been advanced out of the oven, said means being also operable in the event said member is not actuated by a succeeding bottle within a predetermined time to effect reverse rotation of said drum to retract said strip and withdraw said succeeding cap from the oven.

5. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a drum, said strip engaging said drum and the drum being operable upon rotation in one direction to advance said strip and operable in the opposite direction to retract said strip, a bottle actuated member arranged remote from the capping station and being actuated by each bottle of said procession, means operable upon actuation of said member by the first bottle of said procession to effect rotation of said drum to advance the strip and position a cap in the oven, and said means being operable as the bottle approaches the capping station to effect further rotation of said drum to move the heated cap out of the oven to the capping station, and to position the next succeeding cap in said strip in the oven, a cutter operable to sever the heated cap from the strip after the cap has been advanced out of the oven, said means being also operable in the event said member is not actuated by a succeeding bottle within a predetermined time to effect reverse rotation of said drum to retract said strip and withdraw said succeeding cap from the oven, and manually operated means for effecting rotation of said drum independently of said means.

6. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a cap strip feeding and retracting drum journalled in the frame, a pair of drum actuating members, motion transmitting means connecting said members to the drum and including differential gearing, a bottle actuatable member arranged to be actuated by each bottle of said procession, one of said members being operable upon actuation of said bottle actuated member by the first bottle of said procession to effect rotation of said drum to advance the strip and position a cap in the oven, said other drum actuating member being operable as the bottle approaches the capping station to effect further rotation of the drum to advance the strip and move the heated cap out of the oven to the capping station and move the next succeeding cap into the oven, a cutter operable to sever the heated cap from the strip after the cap has been advanced out of the oven, said first drum actuating means being operable, in the event said bottle actuated member is not actuated by a succeeding bottle within a predetermined time, to effect retrograde rotation of said drum to retract said strip and withdraw said succeeding cap from the oven.

7. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a first means operable by the first bottle of said procession to initially advance said strip to move a cap into the oven and being thereafter inoperative upon the continuous advancement of uniformly spaced bottles, a second means operable as each bottle approaches the capping station to advance said strip and move the cap in the oven to cap applying position, cutter means operable to sever said cap from the strip, means operable to effect relative axial movement between the bottle and such cap to position the cap on the top of the bottle, cap folding and cap skirt contracting means operable to contract the skirt of the cap placed upon the bottle, said first means being operable upon the absence of a uniformly spaced bottle in said procession to retract said strip and withdraw the cap then positioned in the oven, and said means being operable by the next succeeding bottle to again initially advance said strip.

8. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a drum journalled in the frame and being operable upon rotation to move the cap strip toward and from said oven, means operable by the first bottle of said procession to effect rotation of said drum to initially advance the strip to move a cap in the oven and said means being thereafter inoperative upon continuous advancement of uniformly spaced bottles, means operable as each bottle approaches the capping station to effect further rotation of said drum to advance said strip and move the cap in the oven to cap applying position, cutter means operable to sever said cap from the strip, means operable to effect relative axial movement between the bottle and such cap to position the cap on the top of the bottle, cap folding and cap skirt contracting means operable to contract the skirt of the cap on the bottle, said first means being operable upon the absence of a uniformly spaced bottle in said procession to effect rotation of said drum in the opposite direction to retract said strip and withdraw the cap then positioned in the oven, and said means being operable by the next succeeding bottle to again effect rotation of said drum and advance the strip to position the cap in the oven.

9. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap heating oven mounted on the frame in juxtaposition to the cap applying station, a drum journalled in the frame and being operable upon rotation to move the cap strip toward and from said oven, means operable by the first bottle of said procession to effect rotation of said drum to initially advance the strip to move a cap in the oven and said means being thereafter inoperative upon continuous advancement of uniformly spaced bottles, means operable as each bottle approaches the capping station to effect further rotation of said drum to advance said strip and move the cap in the oven to cap applying position, cutter means operable to sever said cap from the strip, means operable to effect relative axial movement between the bottle and such cap to position the cap on the top of the bottle, cap folding and cap skirt contracting means operable to contract the skirt of the cap on the bottle, said first means being operable upon the absence of a uniformly spaced bottle in said procession to effect rotation of said drum in the opposite direction to retract said strip and withdraw the cap then positioned in the oven, and said means being operable by the next succeeding bottle to again effect rotation of said drum and advance the strip to position the cap in the oven, and means manually operable independently of said first and second drum operating means to effect rotation of said drum in both directions.

10. A machine for applying hood caps to bottles, the skirts of which caps are rendered adhesive by the application of heat, means operable to advance a procession of bottles toward a cap applying station, means for supporting a plurality of caps attached together in strip formation, a cap heating oven arranged in juxtaposition to said cap applying station, means operable when actuated by a bottle remote from said cap applying station to advance said strip to position the first cap thereof in the oven, and a second means operable when the bottle is approaching said capping station to further advance said strip to move the heated cap out of the oven and position the same over the top of the bottle, and means operable upon an interruption in said procession of bottles to move said strip in reverse direction to remove the second cap from the oven.

11. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps, a cap heating oven mounted on the frame in juxtaposition to the cap applying station, a bottle actuatable member arranged remote from the capping station and being actuated by each bottle of said procession, cap feeding means operable when said bottle actuatable member is actuated to move a cap into the oven, and being operable as the bottle approaches the capping station to move the heated cap out of the oven to the capping station and to move another cap into the oven, and said feeding means being further operable, in the event the next successive bottle of said procession is not presented to said bottle actuatable member within a predetermined time, to move said other cap out of the oven.

12. A machine for applying hood caps to bottles, the skirt portion of said caps being provided with a substance rendered adhesive by the application of heat to make the caps self-securing on the bottles, comprising a frame, means for advancing a procession of bottles to a capping station, a cap feeding and heating unit detachably secured to the frame in juxtaposition to said capping station, a bottle actuatable member arranged remote from the capping station and being actuated by each bottle of said procession, said unit including a cap heating oven and mechanism operable upon actuation of said bottle actuatable member to move a cap into the oven, and being operable as the bottle approaches the capping station to move the heated cap out of the oven to the capping station and move another cap into the oven, and said feeding mechanism being further operable, in the event the next successive bottle of said procession is not presented to said bottle actuatable member within a predetermined time, to move said other cap out of the oven.

13. A machine for applying hood caps to bottles, the skirt portion of said caps being provided with a substance rendered adhesive by the application of heat to make the caps self-securing on the bottles, comprising a frame, means for advancing a procession of bottles to a capping station, means for supporting a plurality of caps joined together in strip formation, a cap feeding, retracting, heating and severing unit detachably secured to the frame in juxtaposition to said capping station, a bottle actuatable member arranged remote from the capping station and being actuated by each bottle of said procession, said unit including a cap heating oven and mechanism operable upon actuation of said bottle actuatable member to move a cap into the oven and being operable as the bottle approaches the capping station to move the heated cap out of the oven to the capping station and sever the heated cap from the strip, said feeding and retracting mechanism being further operable, in the event the next successive bottle of said procession is not presented to said bottle actuatable member within a predetermined time, to retract said strip and move the cap then positioned in the oven out of the oven.

GERHARD H. J. BAULE.